O. E. HUNT.
PUSH BUTTON SUPPORT FOR MOTOR VEHICLES.
APPLICATION FILED JULY 19, 1910.

1,094,789.

Patented Apr. 28, 1914.

Witnesses
J. H. Bruninga
C. S. Brown

Inventor
Ormond E. Hunt

By Foster Freeman Watson Hunt
Attorney

UNITED STATES PATENT OFFICE.

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

PUSH-BUTTON SUPPORT FOR MOTOR-VEHICLES.

1,094,789.

Specification of Letters Patent. Patented Apr. 28, 1914.

Application filed July 19, 1910. Serial No. 572,775.

*To all whom it may concern:*

Be it known that I, ORMOND E. HUNT, a citizen of the United States, and resident of Detroit, county of Wayne, State of Michigan, have invented certain new and useful Improvements in Push-Button Supports for Motor-Vehicles, of which the following is a specification.

This invention relates to push button supports and particularly to push button supports adapted to be mounted upon the steering wheels of motor vehicles.

The objects of this invention are to construct a support which may be readily attached and detached from the steering wheel, which is simple in construction, and which can be moved to any position on the steering wheel and retained thereon.

The invention will be described in connection with the accompanying drawings, in which—

Figure 1:
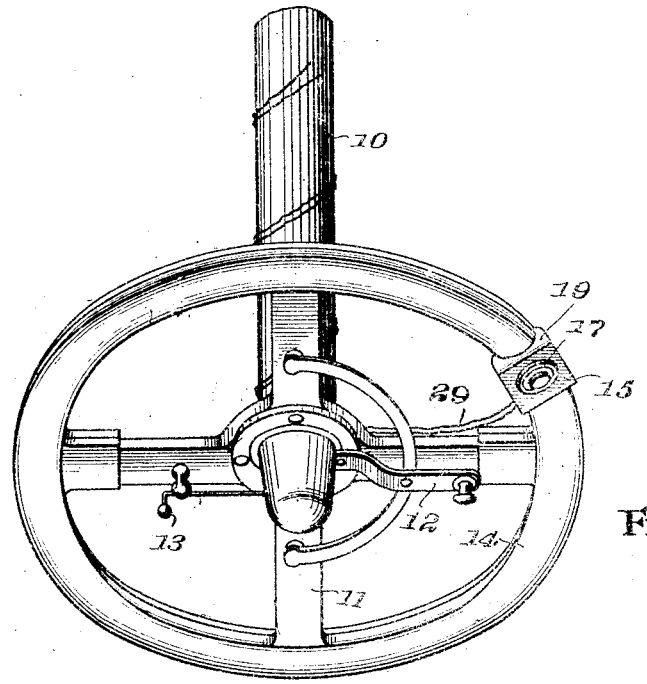
Figure 2:
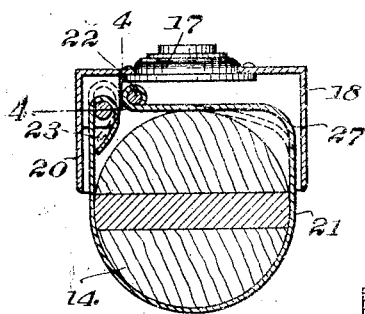
Figure 4:
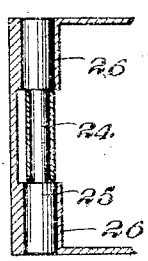
Figure 3:
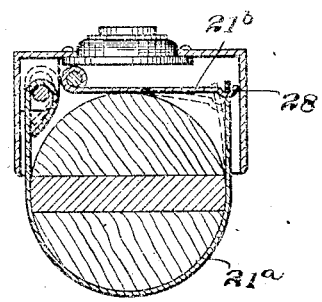

Figure 1 is a plan view of an ordinary inclined steering post and the wheel mounted thereon, showing the invention applied thereto; Fig. 2 is a section through the support and the steering wheel; Fig. 3 is a similar section showing another form of support; and Fig. 4 is a partial section taken on the line 4—4, Fig. 2.

Referring to the drawings, 10 designates a steering post provided with a steering wheel 11, upon which are mounted the usual throttle controlling lever 12 and the spark controlling lever 13. The wheel is provided with the usual rim 14.

A support 15 for a push button 17 is provided with side flanges 18 and 20, and comprises end flanges 19, the latter conforming to the rim as shown in Fig. 1. A sheet metal band 21 preferably of sheet brass or other elastic material is secured at one end to the support by a cross pin 22 extending through an eye formed in the end of the band and through the support, and the other end is provided with a loop 23 which is arranged to engage a reduced portion 24 of a cross pin which extends through holes formed in a pair of separated lugs 26 on the support. The band is provided with a bent portion 27. The loop 23 is of such diameter that the enlarged end of the pin can be easily slipped through it. In order to mount the support upon the wheel rim, the band is passed around the rim and the loop 23 is passed up into the hollow base between the bearing lugs 26. The band is then pinched against the rim of the wheel and the support slightly rotated so as to cause the bend 27 to straighten out slightly as shown in dotted lines thereby causing the band to be lengthened so that the pin can be passed through the loop 23. After the pin is in place and the support released, the band and its bend 27 will be restored to normal shortened position shown in solid lines causing the band to yieldingly clamp the rim. In this position, the engagement between the loop and the shoulders formed by the reduced portion of the pin, prevents removal of the pin until the band has again been lengthened. The pin 26 thus forms a latch which latches the support in position on the wheel, and the band itself which is elastic, forms a means for preventing releasing movement of the latch, and finally prevents the support from being detached.

Fig. 3 shows a slightly different form in which the band is made up of two pieces instead of one. These two pieces are connected by an eye in the piece 21ª engaging a hook 28 in the piece 21ᵇ. The construction of this form is otherwise exactly the same as shown in Fig. 2, and the method of applying and removing the same from the wheel is also the same. This construction has certain advantages over that shown in Fig. 2, in that it does away with the more or less acute angle 27 in the band, and makes a somewhat stronger construction.

It will thus be seen that this invention provides a very efficient support for a push button which may be easily attached to and removed from the steering wheel, and which may be used to control an electrically operated signal or other mechanism. The electrical conductors connected to the push button are designated by the reference character 29 in Fig. 1. The support is slidably mounted on the rim so that it may be moved to any position thereon.

It is obvious that various changes may be made in the details of construction without departing from this invention, and it is, therefore to be understood that this invention is not to be limited to the specific construction shown and described.

Having thus described the invention, what is claimed is:

1. The combination with a motor vehicle steering wheel, of a push button support thereon, and means for clamping said support to said wheel, including a latching device adapted to be released, to permit removal of said support by a rotative movement applied to the support.

2. The combination with a support for a push button, of a flexible attaching band connected thereto, latching means for detachably securing one end of said band to said support, said latching means being released by flexing said band.

3. The combination with a support for a push button, of a yielding attaching band connected thereto, latching means for detachably securing one end of said band to said support, said band normally holding said latching means against releasing movement and permitting the same to be released by flexing said band.

4. The combination with a support for a push button, of an attaching band connected thereto, latching means for detachably securing one end of said band to said support, and means whereby said band prevents release movement of said latching means.

5. The combination with a support for a push button, of a flexible attaching band connected thereto, latching means for detachably securing one end of said band to said support, and means whereby said band prevents release movement of said latch, said means being constructed to release said latch when said band is flexed.

6. The combination with a push button support having alined holes therein, of an attaching band having one end secured to said support, and having a loop at the other end, a pin adapted to pass through said holes and having a reduced central portion passing through said loop, whereby said pin is held in place when said band is under tension.

7. The combination with a support for a push button, of attaching means therefor, and securing means for said attaching means adapted to be released by a rotative movement of said support.

8. The combination with a support for a push button, of attaching means therefor, latching means for said attaching means, and means releasing said latching means when a rotative movement is applied to said support.

In testimony whereof I affix my signature in presence of two witnesses.

ORMOND E. HUNT.

Witnesses:
W. H. FINCKEL, Jr.,
C. I. DALE.